(12) United States Patent
Liao (10) Patent No.: US 7,385,806 B2
(45) Date of Patent: Jun. 10, 2008

(54) COMBINATION HOUSING OF A NOTEBOOK COMPUTER

(76) Inventor: Kim Liao, No. 25, DaHua 9th Street, Taoyuan City, Taoyuan County 300 (TW)

( * ) Notice: Subject to any disclaimer, the term of this patent is extended or adjusted under 35 U.S.C. 154(b) by 503 days.

(21) Appl. No.: 11/189,714

(22) Filed: Jul. 27, 2005

(65) Prior Publication Data

US 2007/0025072 A1 Feb. 1, 2007

(51) Int. Cl.
*G06F 1/16* (2006.01)
(52) U.S. Cl. ............... 361/679; 361/683; 312/223.1
(58) Field of Classification Search ........ 361/679–683; 312/223.1, 223.2; 348/952; 345/905
See application file for complete search history.

(56) References Cited

U.S. PATENT DOCUMENTS

| 6,125,033 | A  * | 9/2000 | Andre et al. ............... 361/683 |
| 6,574,096 | B1 * | 6/2003 | Difonzo et al. ............. 361/683 |
| 7,012,189 | B2 * | 3/2006 | Kriege et al. ............... 174/377 |
| 7,046,507 | B2 * | 5/2006 | Nakamura et al. .......... 361/681 |
| 2007/0014079 | A1 * | 1/2007 | Chen .......................... 361/679 |
| 2007/0109737 | A1 * | 5/2007 | Kriege et al. ............... 361/683 |

* cited by examiner

*Primary Examiner*—Jayprakash N Gandhi
*Assistant Examiner*—Anthony Q Edwards
(74) *Attorney, Agent, or Firm*—Rosenberg, Klein & Lee (57) ABSTRACT

A combination housing of a notebook computer having a display housing and a main frame housing. The main frame housing including a top metal cover, a first middle plastic frame, and a bottom metal cover three of which are combined to form a sandwich structure. Meanwhile, the main frame housing including a front metal cover, a second middle plastic frame, and a rear metal cover three of which are combined to form a sandwich structure. Besides, an engagement of engaging parts of the metal covers in corresponding arched cavities of the middle plastic frames is utilized to permit a rapid fastening. In this way, the main housing portion of the notebook computer can be made of aluminum ally or aluminum magnesium alloy.

7 Claims, 10 Drawing Sheets

COMBINATION HOUSING OF A NOTEBOOK COMPUTER

BACKGROUND OF THE INVENTION

1. Field of the Invention

The invention relates to a combination housing of a notebook computer, and more particularly, to a combination housing of a notebook computer having a display housing and a main frame housing each of which includes two metal covers that are attached to a middle plastic frame, thereby forming a sandwich structure.

2. Description of the Related Art

With the advancement of production technology and the rationalization of price, the notebook computer has gradually replaced the desktop computer and becomes essential merchandise in the computer market. Previously, the notebook computer met working requirements of few professionals, and now it has been made widely available to all kinds of people. Therefore, in addition to having complete functions, the notebook computer also has to own shock resistance and can be protected from the electromagnetic interference. Even, it has to fulfill the recycling requirement by recovering of old notebooks for catering to the need of the market.

Figure 1:
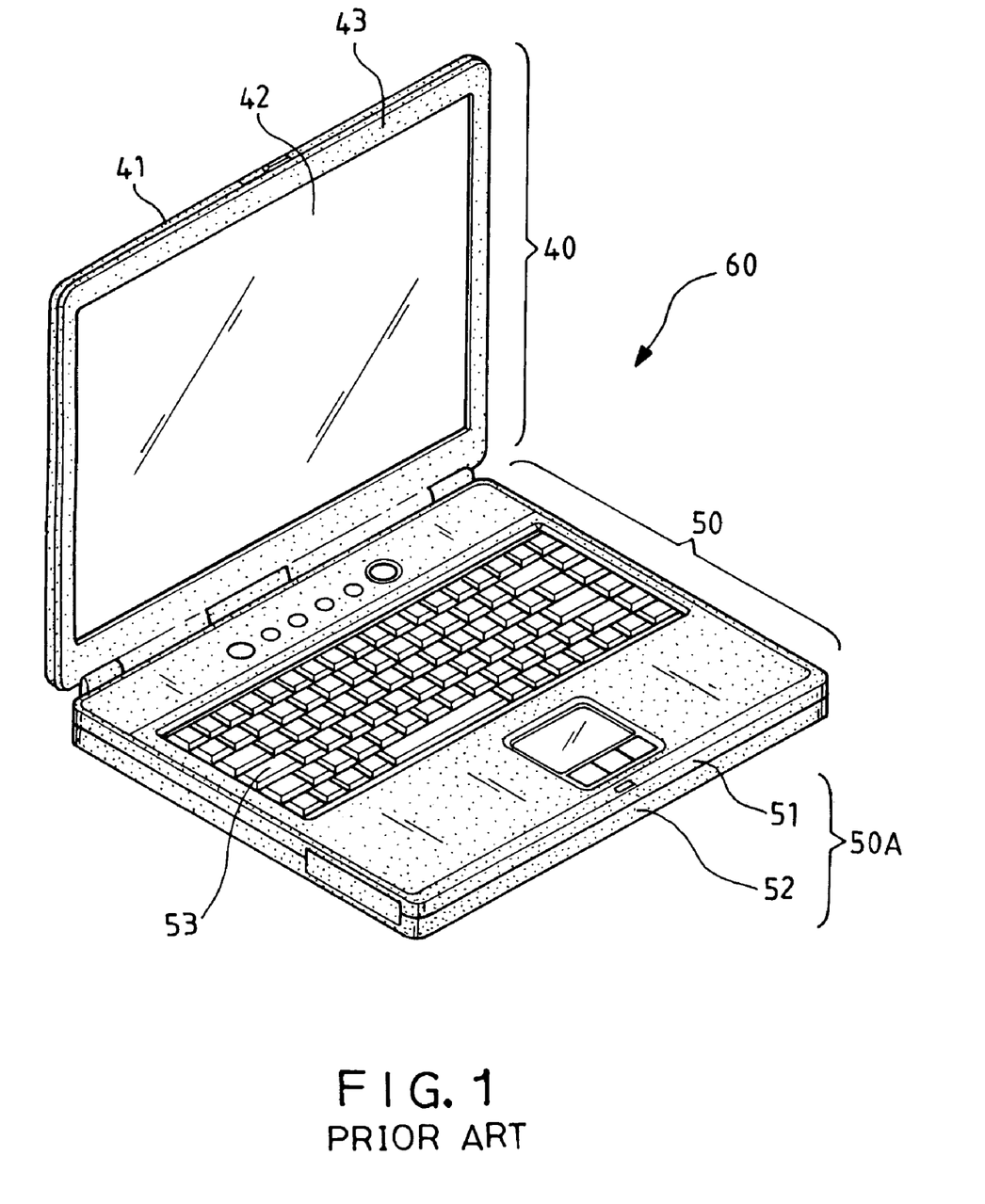
FIG. 1 is a perspective view of a conventional notebook computer.
Figure 2:
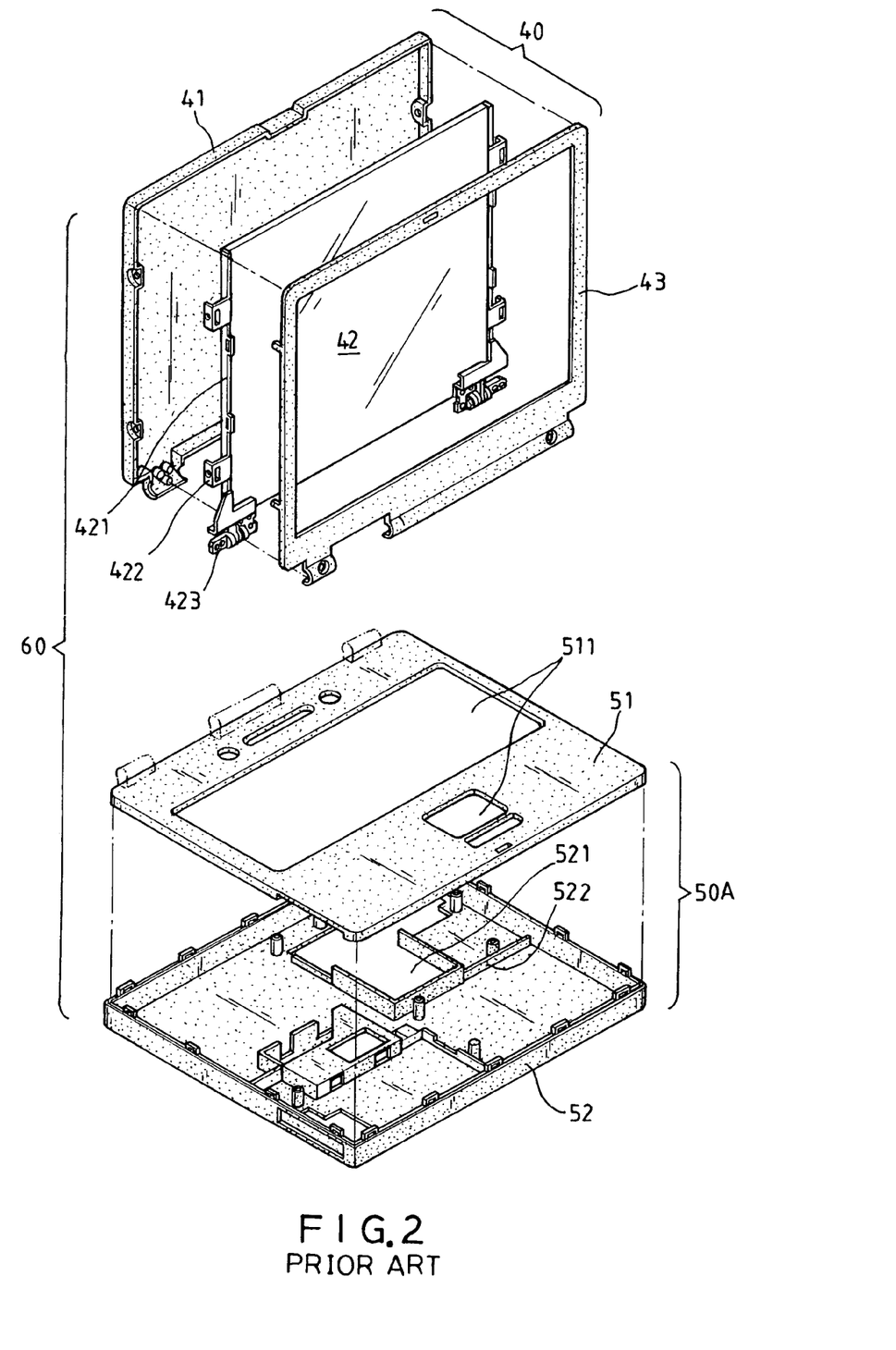
FIG. 2 is a perspective exploded view of the conventional notebook computer in accordance with FIG. 1.

As shown in FIGS. 1 and 2, a conventional notebook computer 60 includes a display 40 and a main frame 50. The bottom rim of the display 40 is pivotally coupled to the rear side of the main frame 50. The display 40 includes a display panel 42, a rear housing 41 for accepting the display panel 42, and a front housing 43 for holding the display panel 42 in place. The display panel 42 includes LCD or other self-illuminating elements and contains a corresponding positioning bar 421 and positioning pieces 422 at two sides thereof. The positioning rods 421 each have a hinge 423 at the bottom thereof for a pivotal connection to a connection bar (not shown). In this way, the display 40 and the main frame 50 can be pivotally joined together. So, the display 40 can be swiveled on the main frame 50 in an open or a closed position.

The main frame 50 consists of a top housing 51 and a bottom housing 52 both of which are joined together to form a main frame housing 50A. The top housing 51 and the bottom housing 52 define a receiving space for holding a keyboard 53, a mother board and other electronic devices (e.g. hard disk drive, optical devices, etc.) that are not shown in the figures. So, the top housing 51 and the bottom housing 52 have to be provided with corresponding grooves 511, 521 and partition ribs 522.

The housing structure of the above-mentioned notebook computer 60 primarily consists of the rear housing 41, the front housing 43, the top housing 51, and the bottom housing 52. Other small elements are not described hereinafter. These four portions are mainly formed by an injection molding process of plastic and ABS (acrylonitrile butadiene styrene) or PC (Polycarbonate)+ABS material, and then fastened with screws or engaging elements. However, these plastic housings have to undergo a special surface treatment with printing or coating process. This results in recovery difficulties later. Moreover, the whole plastic injection molding machine is expensive. Meanwhile, the plastic strength is not so high as metal strength so that the thickness of the plastic housings has to be maintained above 0.8-1.2 mm for ensuring a sufficient material strength. Otherwise, the computer housing is easily damaged. So, the cost thereof is not low as well. In addition, the use of the plastic housing can't prevent the notebook computer from electromagnetic interference. This is a big imperfection, too.

Currently, the conventional plastic housing still leaves much to be desired. The aluminum magnesium alloy is applied to the notebook computer due to its light weight, high mechanical strength, and excellent texture. Unlike the plastic goods that can be formed by injection molding process with high efficiency, the aluminum magnesium alloy goods are made only by die casting that requires a molding tool cost triple as high as the injection molding tool cost. Moreover, the yield rate is too low as well so that the production cost is considerably increased. Accordingly, this is only applicable to the products with the requirement of the top quality. So, the production is commonly done by stamping process. However, the stamping elements still have many restrictions. For example, the depth can't be too large; otherwise, the stamping process will be completed with difficulties. The connection between metal stamping elements often produces assembly problems due to precision control difficulties. Thus, the stamping element made of aluminum ally or aluminum magnesium alloy can only be applied to the rear housing 41, rather than to the front housing 43, the top housing 51 and the bottom housing 52 due to the aforementioned factors.

SUMMARY OF THE INVENTION

A primary object of the invention is to eliminate the above-mentioned problems and to provide a combination housing of a notebook computer having a display housing and a main frame housing each of which includes two metal covers that are attached to a middle plastic frame to form a sandwich structure. Moreover, the thickness of the metal covers 41, 51, 52 ranging from 0.7 mm to 0.8 and that of the metal cover 43 ranging from 0.5 mm to 0.6 mm can ensure the required structural strength, thereby making the notebook computer housing beautiful and providing it with excellent texture. Since the surface is made of metal, the notebook computer housing is abrasion-proof and crash-proof. Meanwhile, the notebook computer can be protected from the electromagnetic interference.

Another object of the invention is to provide a combination housing of a notebook computer that utilizes an engagement of engaging parts of the metal covers in corresponding arched cavities of the middle plastic frames to permit a rapid fastening and to minimize the number of the employed screws. Accordingly, the assembly of the combination housing of a notebook computer is much simplified.

A further object of the invention is to provide a combination housing of a notebook computer most of which can be recycled to permit an environmentally friendly reuse of resources. Meanwhile, the environmental pollution can be effectively reduced.

Still another object of the invention is to provide a combination housing of a notebook computer that employs a metal stamping mold with a lower cost than the plastic injection molding tool. Accordingly, the production cost can be minimized while the service life of the metal housings can be extended.

The above-mentioned objects can be fulfilled by the characteristics described in claims 1 through 3. Advantageous design features are stated in the subordinate claims:

BRIEF DESCRIPTION OF THE FIGURES

The accomplishment of this and other objects of the invention will become apparent from the following descriptions and its accompanying figures of which.

DETAILED DESCRIPTION OF THE PREFERRED EMBODIMENT

Figure 3:
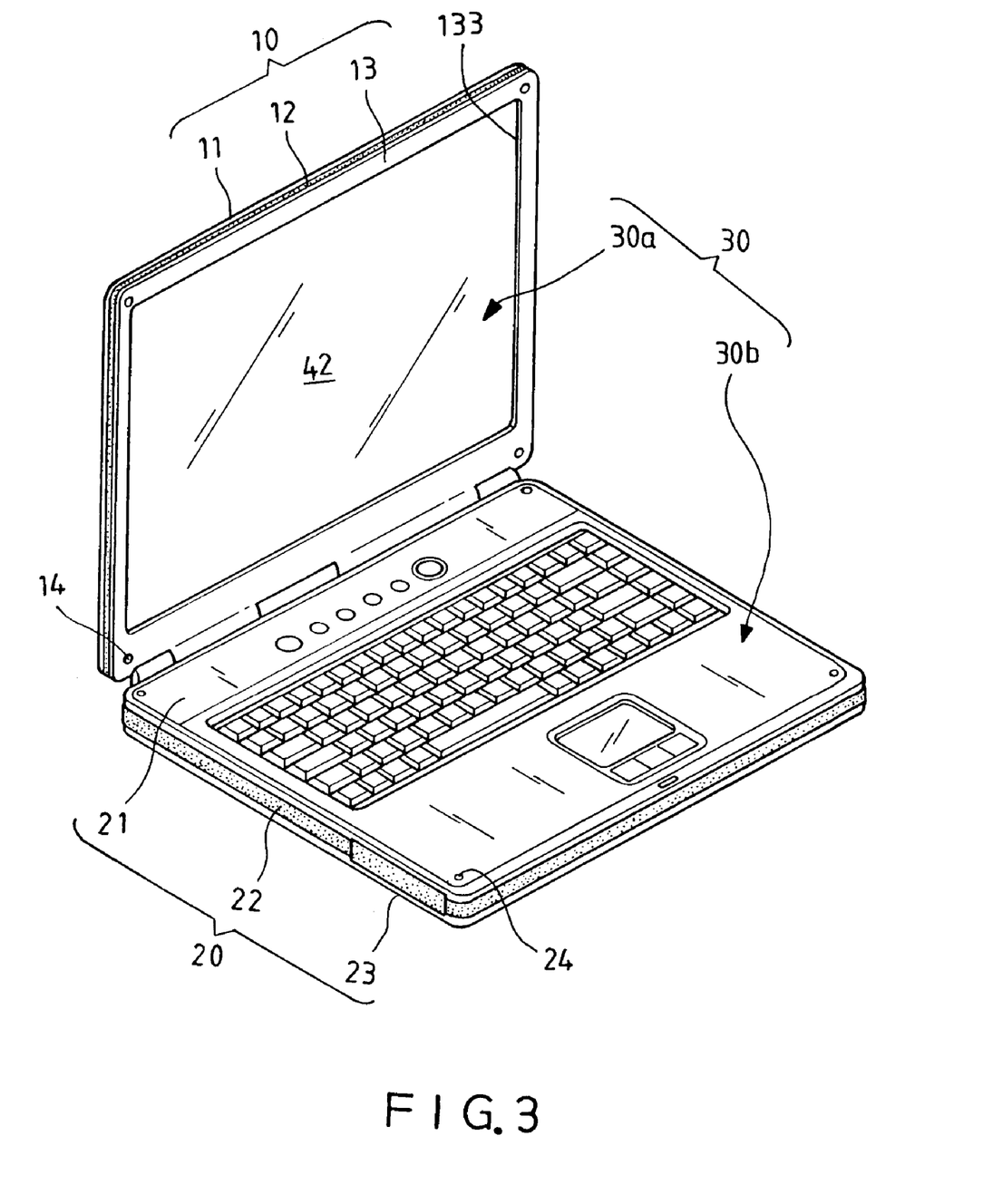
FIG. 3 is a perspective view of a preferred embodiment of a notebook computer in accordance with the invention.

First of all, referring to FIG. 3, a notebook computer in accordance with the invention includes a conventional display 30a and a main frame 30b. The other apparatuses like display panel, mother board, electronic devices, optic devices, etc. belong to the prior art so that no further descriptions thereto are given hereinafter.

The invention features in the combination structure of a display housing 10 and a main frame housing 20. As shown in FIG. 3, the main frame housing 20 consists of a top metal cover 21, a first middle plastic frame 22 and a bottom metal cover 23 that are combined to form a sandwich structure. Meanwhile, the display housing 10 consists of a rear metal cover 11, a second middle plastic frame 12 and a front metal cover 13 that are combined to form a sandwich structure. The material of the above-mentioned metal covers is preferably selected from a group consisting of aluminum, magnesium, and aluminum-magnesium alloy. It should not be restricted thereto. Another equivalent metal or alloy is applicable thereto.

Figure 4:
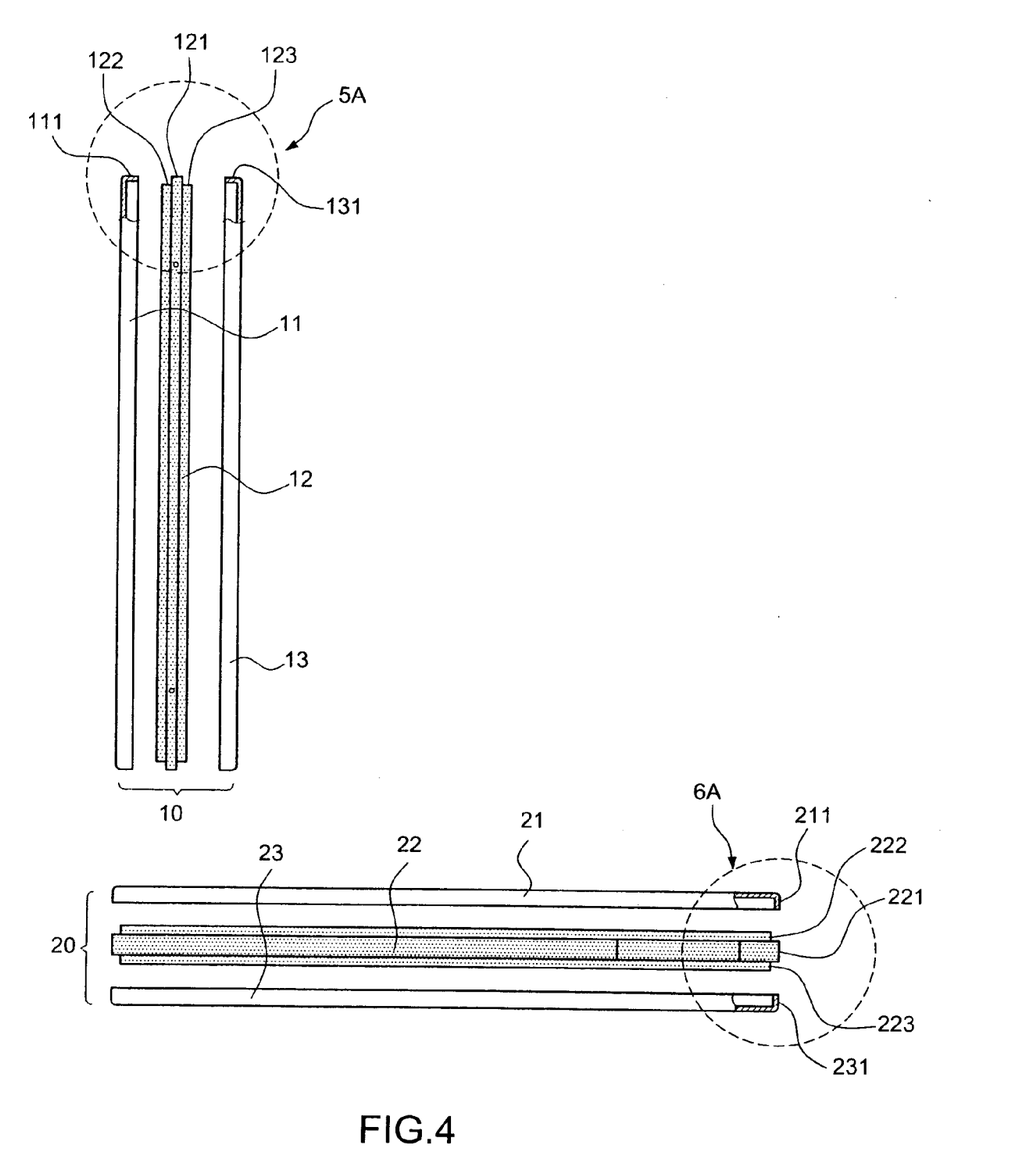
FIG. 4 is an exploded side view of the preferred embodiment of a notebook computer in accordance with the invention.

As shown in FIG. 4, the rear metal cover 11 is formed in a stamping process such that a rim portion 111 is bent forward with a rear engaging part 112 at the inner side thereof. The rear engaging part 112 is formed at the same time when the rear engaging part 112 is created. Alternatively, the rear engaging part 112 can be formed separately in a reworking process. The front metal cover 13 is formed in a stamping process to create a frame-shaped body with a hollowed portion 133 at the center thereof for receiving a display panel 42 (see FIG. 3).

Figure 5A:
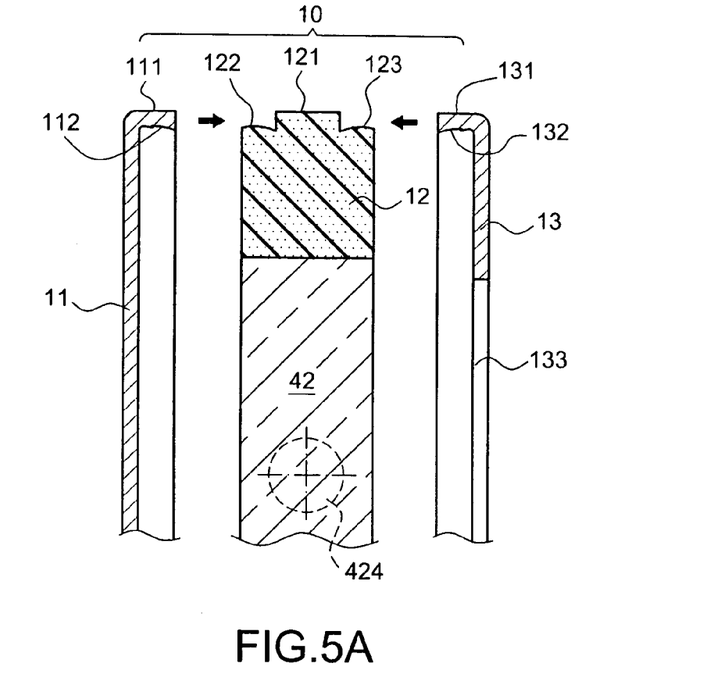
FIG. 5A is an enlarged cross-sectional view of the section 5A of FIG. 4.
Figure 5B:
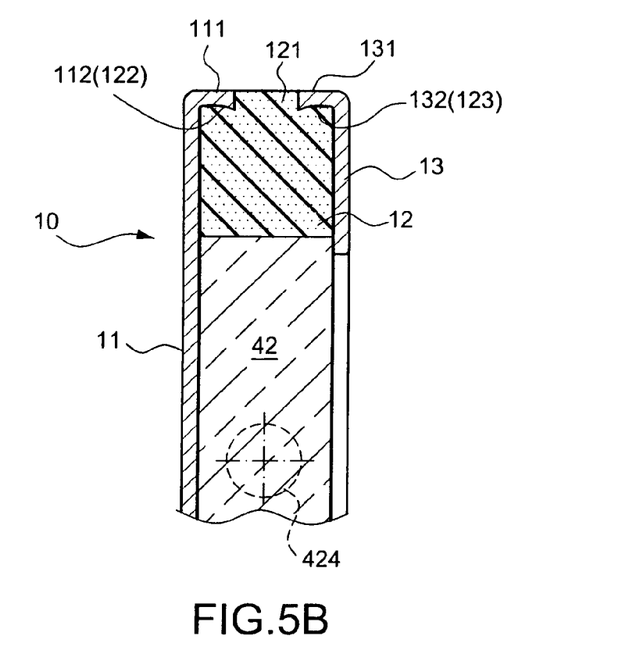
FIG. 5B is an enlarged cross-sectional view of FIG. 5A after assembly.
Figure 6A:
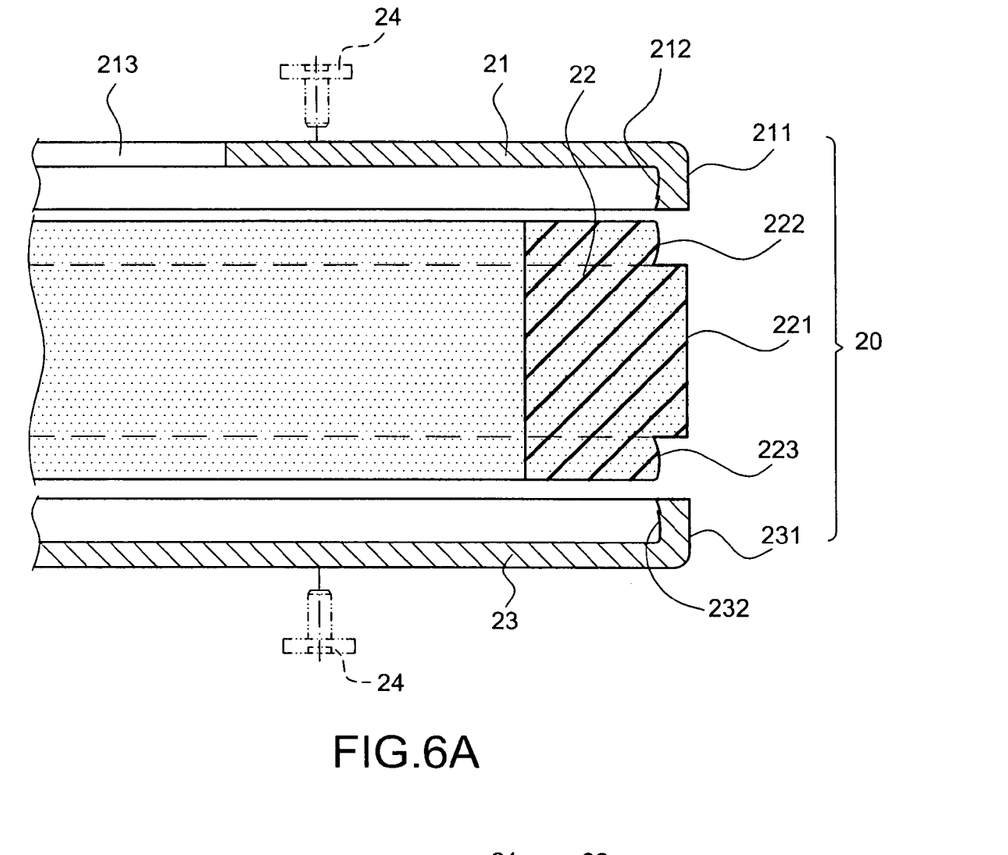
FIG. 6A is an enlarged cross-sectional view of the section 6A of FIG. 4.
Figure 6B:
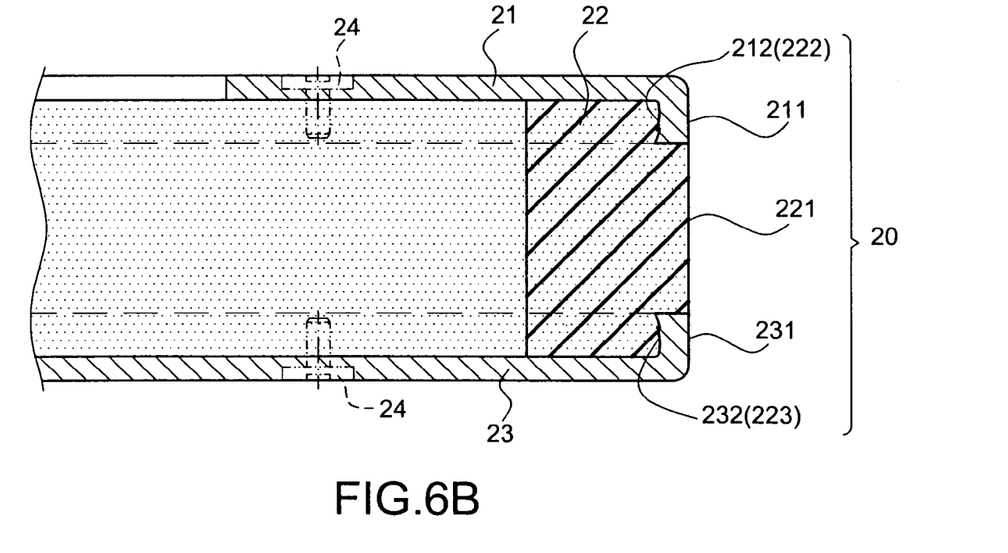
FIG. 6B is an enlarged cross-sectional view of FIG. 6A after assembly.

Referring to FIG. 5A, the top of the front metal cover 13 is bent backward to form a rim portion 131 with a front engaging part 132 at the inner side thereof. The second middle plastic frame 12 includes a middle protrusion portion 121 defining a front and a rear frame portion of the display housing 10 with a front and a rear cavity 122, 123, respectively. In this way, the rear engaging part 112 of the rim portion 111 and the front engaging part 132 of the rim portion 131 can fit snugly in the front and the rear cavity 122, 123 of the second middle plastic frame 12, respectively. Accordingly, the rear metal cover 11, the second middle plastic frame 12 and the front metal cover 13 can be joined together to form a sandwich structure, as shown in FIG. 5B.

Figure 4A:
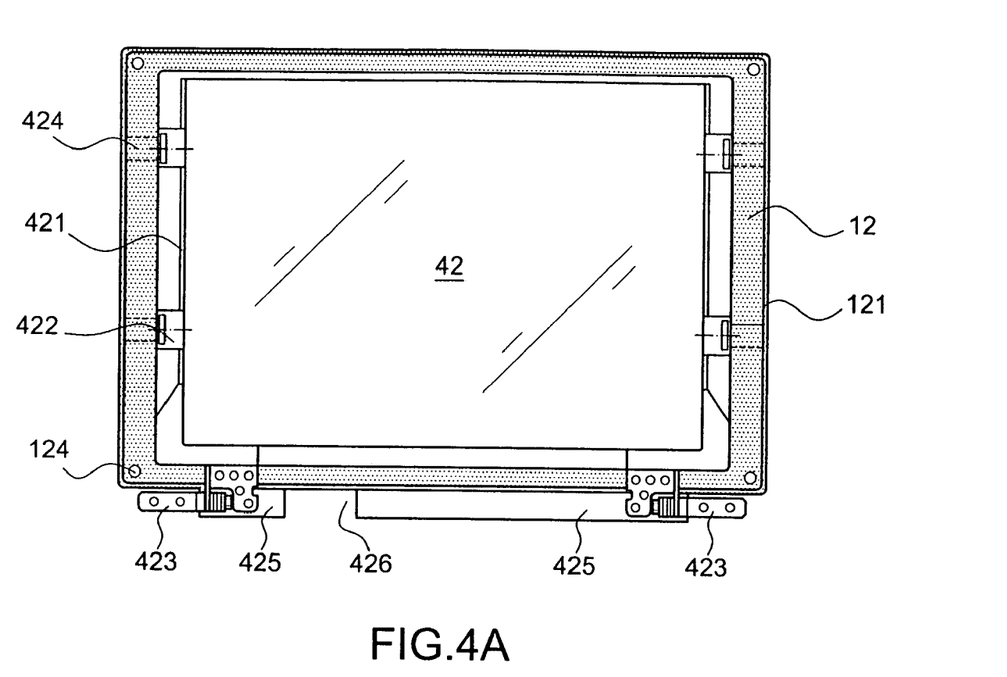
FIG. 4A is a front view of a first middle plastic frame of a display housing of the invention.
Figure 4B:
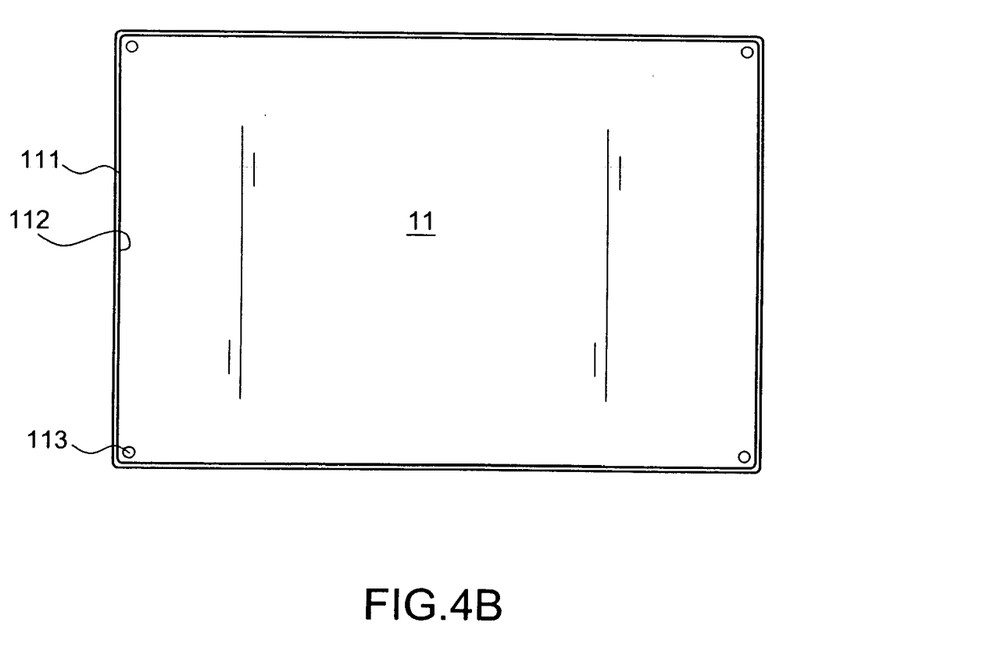
FIG. 4B is a front view of a rear metal cover of the display housing of the invention.
Figure 4C:
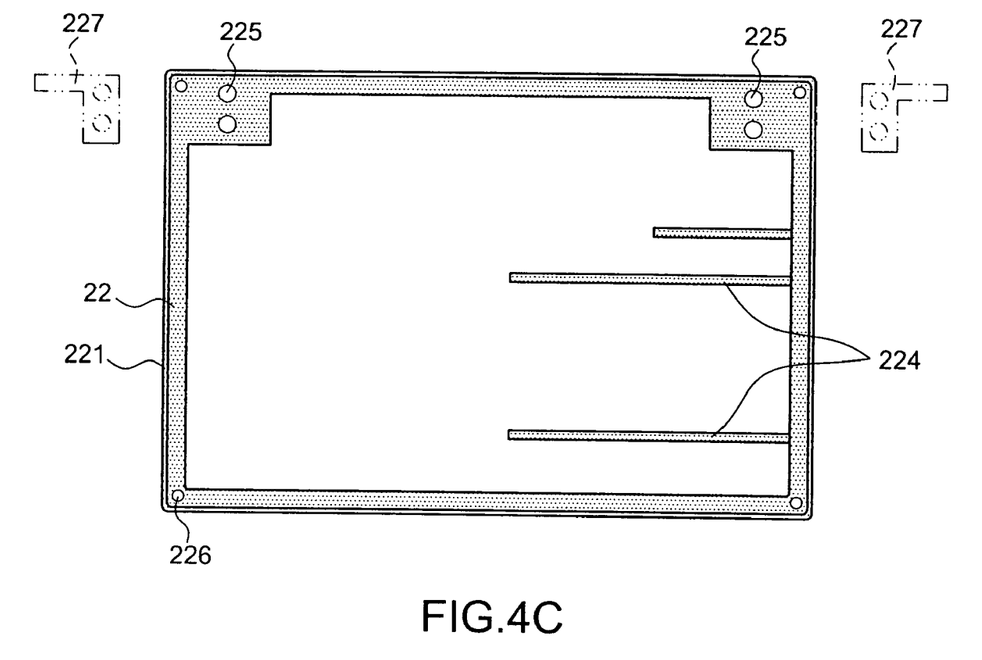
FIG. 4C is a front view of a rear metal cover of a main frame housing of the invention.
Figure 4D:
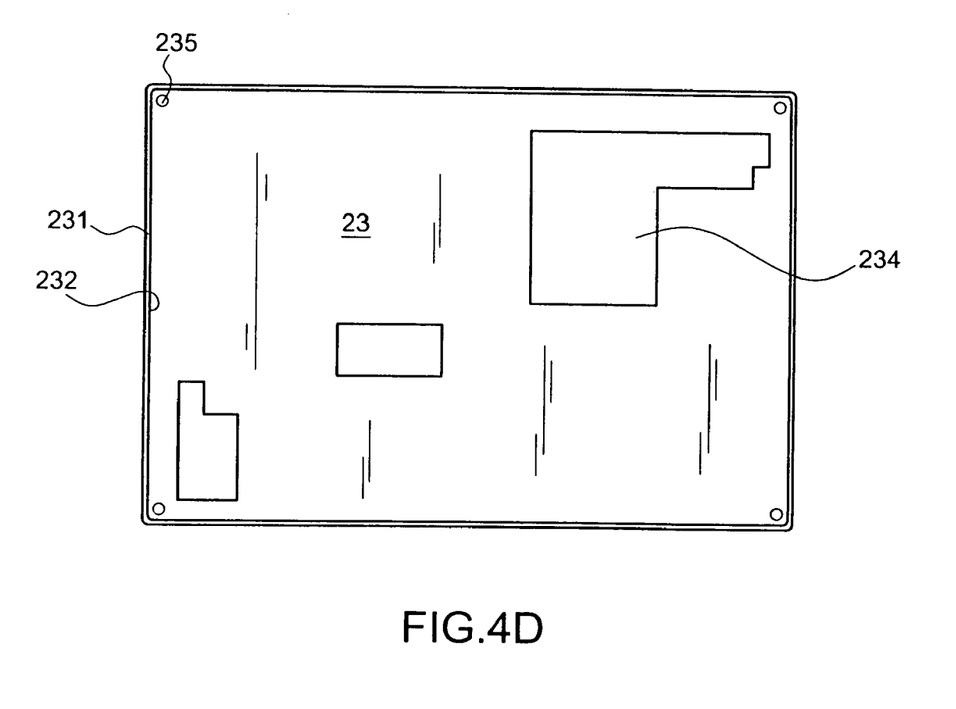
FIG. 4D is a front view of a bottom metal cover of the main frame housing of the invention.
Figure 7:
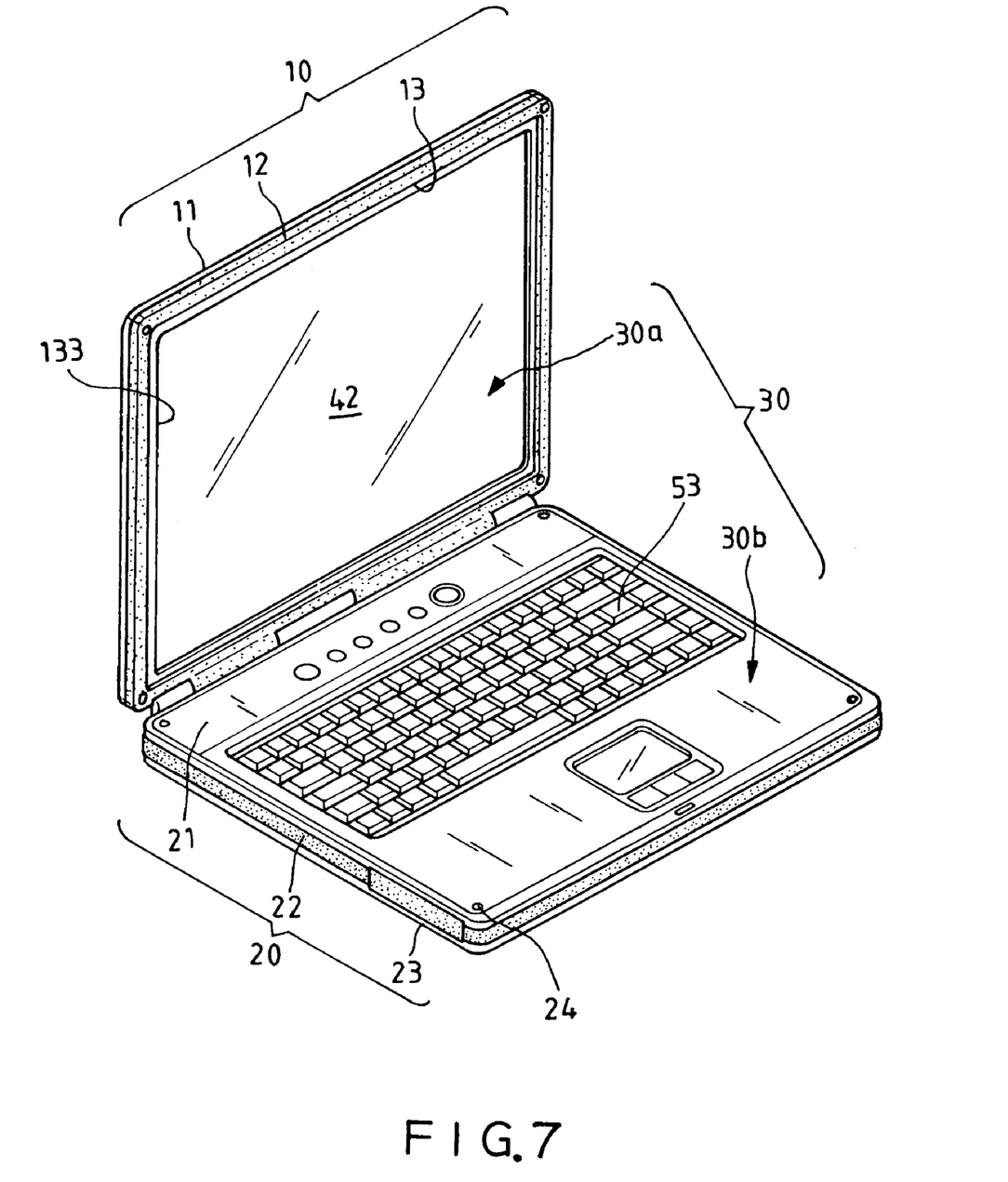
FIG. 7 is a perspective view of another preferred embodiment of a notebook computer in accordance with the invention.
Figure 8A:
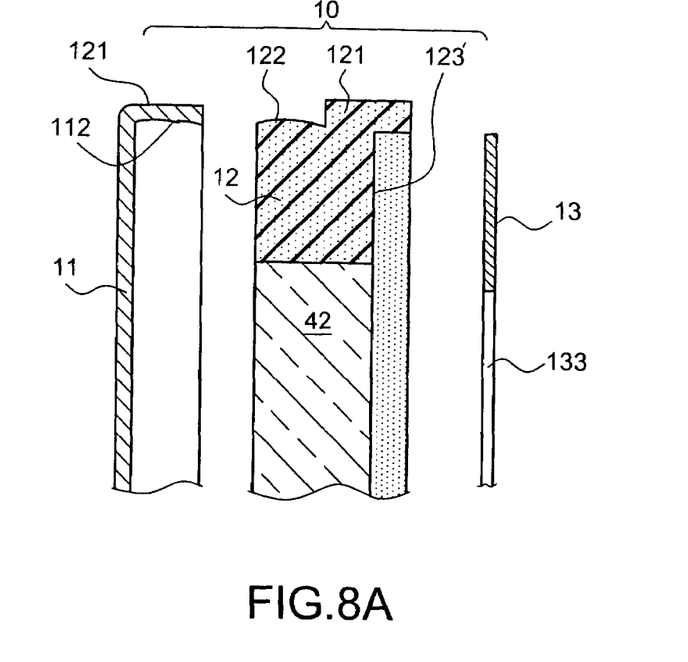
FIG. 8A is an exploded side view of the display housing in accordance with FIG. 7.
Figure 8B:
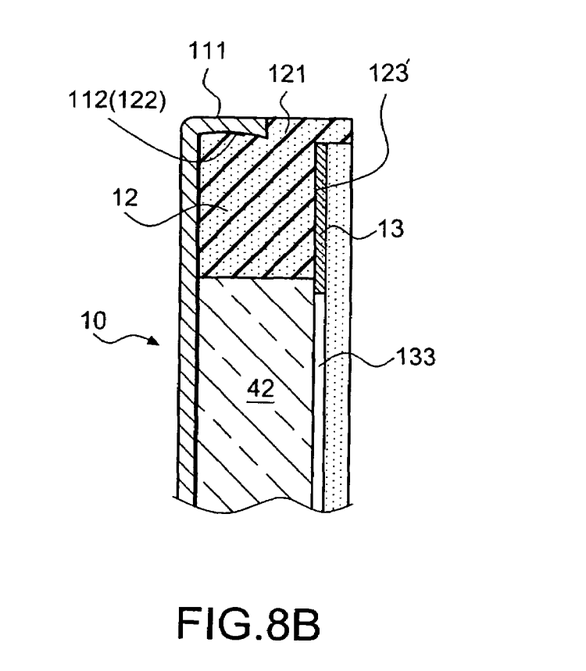
FIG. 8B is an exploded side view of the display housing in accordance with FIG. 7 after assembly.

As shown in FIGS. 4A and 4B, the display panel 42 having positioning rods 421 and positioning elements 422 at both sides thereof is locked at the inner side of the second middle plastic frame 12 by respective locking elements 424. The positioning rods 421 include each at the bottom thereof a hinge 423 that protrudes from the bottom side of the second middle plastic frame 12. The display panel 42, the positioning rods 421 and the hinges 423 belong to the prior art so that no further descriptions to their detailed elements are given hereinafter. The protruding hinge 423 is coupled to a corresponding a mounting element 227 and then fixed to tenon screw holes 225. In this way, the display 30a and the main frame 30b, as shown in FIG. 3, are pivotally coupled at the bottom rear side thereof. This structure doesn't fall within the scope of the claim of the invention. However, the aforementioned descriptions imply the applicability of the invention. As shown in FIG. 3, each of four corners of the front metal cover 13 of the display housing 10 includes a second screw 14. Another fixing elements equivalent to the screw are also applicable. The second screws 14 fit in corresponding through holes 124 of the second middle plastic frame 12 and are then locked in the tenon screw holes 113 of the rear metal cover 11 (see FIG. 4A and 4B). Accordingly, the rear metal cover 11, the second middle plastic frame 12 and the front metal cover 13 can be tightly combined together. Meanwhile, the rear metal cover 11 protects the front metal cover 13 and the rear metal cover 11 from contact to each other while they are joined together. So, it is avoidable that uneven contact faces of both stamped metal pieces are created due to precision error resulted from the stamping process. As shown in FIG. 5B, the display housing 10 in the combination sandwich type has a flush external rim without gap. It's because that the flexibility of the second middle plastic frame 12 can absorb the slight manufacturing error. In this way, the stamping pieces can be made flush. In addition to the above-mentioned effects, the second middle plastic frame 12 permits a beautiful appearance. So, it can serve many purposes. As shown in FIGS. 4C, 4D, 6A and 6B, the main frame housing 20 consists of a top metal cover 21, a first middle plastic frame 22 and a bottom metal cover 23 that are combined to form a sandwich structure. The top metal cover 21 is stamped in a form with both ends 211 bent downward while the bottom side of the top metal cover 21 defines a cavity portion. The bending ends 211 of the top metal cover 21 each have an upper engaging portion 212 at the inner side of the bending ends 211. The bottom metal cover 23 is stamped in a form with both ends 231 bent upward while the top side of the bottom metal cover 23 defines a cavity portion. The bending ends 231 of the bottom metal cover 23 each have a lower engaging portion 232 at the inner side of the bending ends 231. The first middle plastic frame 22 includes a middle protrusion portion 221 at the center thereof defining a front and a rear frame portion of the main frame housing 20 with a top and a bottom arched cavity 222, 223, respectively. In this way, the upper engaging portion 212 of the bending end 211 and the lower engaging portion 232 of the bending end 231 can fit snugly in the top and the bottom arched cavity 222, 223 of the first middle plastic frame 22, respectively. Accordingly, the top metal cover 21, the first middle plastic frame 22 and the bottom metal cover 23 can be combined together to form a sandwich structure with a flush external rim without gaps. The sandwich structure of the main frame housing 20 is identical with that of the aforementioned display housing 10. The difference lies in the position of cavities and other configuration designed for meeting different requirements. As shown in FIGS. 4C and 4D, the inside of the first middle plastic frame 22 can receive a mother board, a CD-ROM, and other electronic components. So, the main frame housing 20 can be provided with partition ribs 224 and through holes 226. Meanwhile, the bottom metal cover 23 includes cavities 234 and tenon screw holes 235 in accordance with difference requirements and notebook computer models. No further descriptions thereto are given hereinafter. Referring to FIGS. 7, 8A, and 8B, the configuration of the display housing 10 is the same to that of the display housing of the previous embodiments. The difference lies in that the front metal cover 13 is stamped to be a flat frame with a middle cavity 133 for accepting the display panel 42. Meanwhile, the second middle plastic frame 12 includes a middle protrusion portion 121 at a front section thereof and a cavity 122 at a rear section thereof. The cavity 122 extends from the middle protrusion portion 121 to the rear outside wall of the second middle plastic frame 12. The cavity 122 serves to hold the rear metal cover 11 in place. The inner rim of the middle protrusion portion 121 defines a front groove 123' for receiving the front metal cover 13 in place. In this way, the rear metal cover 11, the second middle plastic frame 12, and the front metal cover 13 of the display housing 10 are combined together to form a sandwich structure. The front metal cover 13 can be fastened in position by glue or by screws 14. It's taken into account that the swiveling configuration and position of this embodiment are something different from that of the previous embodiment. Some of them are more complicated. So, the front metal cover 13 can be designed in a flat frame type that requires only an easier stamping process. Meanwhile, the pivoted portion of the display housing 10 extends from the bottom of the second middle plastic frame 12 and is integrally formed therewith. Alternatively, a small member 425 can be extruded and mounted around the hinge 423 as shown in FIG. 4A. Besides, the not-shown lead of the display panel 42 can be extended from the small member 425 and enters from a pivoted connection opening 426 into the main frame for an electric connection to the circuit board. These components are not objects of the invention so that no further descriptions thereto are given hereinafter.

Based on the above-mentioned sandwich structure of the invention, the display housing 10 and the main frame housing 20 are made of material selected from a group consisting of aluminum, magnesium, and aluminum-magnesium alloy and formed in a stamped process except that the middle protrusion portions 121, 221 extends from the middle transitional portion. This provides not only the metal housing of high technology. All of the production speed, defect-free rate, and structural strength are also superior to the conventional plastic housing. Moreover, the metal surface is not sprayed with any coating so that all material can be recycled for reuse. This ensures an environmentally friendly application. In addition, the metal surface produces a hairline texture after a special grinding, polishing, and anodizing treatment. The fabrication of the invention doesn't require injection molds but stamping dies so that the fabrication cost can be considerably reduced. Furthermore, the stamping metal piece includes vertical sides so that the strength of the whole cover can be enhanced. In this way, the thickness of the stamping metal pieces can be lower than that of plastic members, thereby creating a light-weight and compact notebook computer.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A combination housing of a notebook computer comprising:
    a) a main frame housing adapted to accept a keyboard and other electronic devices, and
    b) a display housing pivotally coupled to a rear side of the main frame housing for holding a display panel in place,
    wherein the main frame housing including a top metal cover, a first middle plastic frame, and a bottom metal cover three of which are combined to form a sandwich structure;
    wherein the top metal cover is stamped in a form with both ends bent downward while the bottom side of the top metal cover defines a cavity portion, and the bending ends of the top metal cover each have an upper engaging portion at the inner side of the bending ends;
    wherein the bottom metal cover is stamped in a form with both ends bent upward while the top side of the bottom metal cover defines a cavity portion, and the bending ends of the bottom metal cover each have a lower engaging portion at the inner side of the bending ends; and
    wherein the first middle plastic frame includes a middle protrusion portion at the center thereof defining a top and a bottom frame portion of the main frame housing with a top and a bottom arched cavity, respectively,
    whereby the upper engaging portion of the top metal cover and the lower engaging portion of the bottom metal cover can fit snugly in the top and the bottom arched cavity of the second middle plastic frame to ensure a stable sandwich configuration created by attaching the top metal cover and the bottom metal cover to the first middle plastic frame.

2. A combination housing of a notebook computer comprising:
    a) a main frame housing adapted to accept a keyboard and other electronic devices, and
    b) a display housing pivotally coupled to a rear side of the main frame housing for holding a display panel in place,
    wherein the display housing including a front metal cover, a second middle plastic frame, and a rear metal cover three of which are combined to form a sandwich structure;
    wherein the rear metal cover is stamped in a form with both ends bent forward while the inner wall of the rear metal cover defines a cavity portion, and the bending ends of the rear metal cover each have a rear engaging portion at the inner side of the bending ends; and
    wherein the front metal cover is stamped in a form with both ends bent backward while the inner wall of the front metal cover defines a cavity portion, and the bending ends of the front metal cover each have an upper engaging portion at the inner side of the bending ends;

wherein the second middle plastic frame includes a middle protrusion portion at the center thereof defining a front and a rear frame portion of the display housing with a front and a rear arched cavity, respectively, whereby the front engaging part of the front metal cover and the rear engaging part of the rear metal cover can fit snugly in the front and the rear arched cavity of the second middle plastic frame to ensure a stable sandwich configuration created by attaching the front metal cover and the rear metal cover to the second middle plastic frame.

3. A combination housing of a notebook computer comprising:
   a) a main frame housing adapted to accept a keyboard and other electronic devices, and
   b) a display housing pivotally coupled to a rear side of the main frame housing for holding a display panel in place, wherein the display housing including a front metal cover, a second middle plastic frame, and a rear metal cover three of which are combined to form a sandwich structure;

wherein the rear metal cover is stamped in a form with both ends bent inward while the inner wall of the rear metal cover defines a cavity portion, and the bending ends of the rear metal cover each have a rear engaging portion at the inner side of the bending ends; and wherein the front metal cover is stamped in a flat frame type with a middle cavity to accept the display panel;

wherein the second middle plastic frame includes a protrusion portion at a front section thereof defining a rear and a front frame portion of the display housing with a rear arched cavity and a front groove, respectively;

whereby the front groove of the front frame portion serves to receive the front metal cover in place while the rear engaging part of the rear metal cover fits snugly in the front arched cavity of the second middle plastic frame to ensure a stable sandwich configuration created by attaching the front metal cover and the rear metal cover to the second middle plastic frame.

4. The combination housing of a notebook computer as recited in claim 1 wherein the material of the top metal cover and the bottom metal cover is selected from a group consisting of aluminum, magnesium, and aluminum-magnesium alloy.

5. The combination housing of a notebook computer as recited in claim 1 wherein the attachment of the top metal cover and the bottom metal cover to the first middle plastic frame creates a sandwich structure with a flush external rim without gap.

6. The combination housing of a notebook computer as recited in claim 2 wherein the material of the front metal cover and the rear metal cover is selected from a group consisting of aluminum, magnesium, and aluminum-magnesium alloy.

7. The combination housing of a notebook computer as recited in claim 2 wherein the attachment of the front metal cover and the rear metal cover to the second middle plastic frame creates a sandwich structure with a flush external rim without gap.

* * * * *